(12) United States Patent
Goodman et al.

(10) Patent No.: US 11,029,435 B2
(45) Date of Patent: *Jun. 8, 2021

(54) DOWNHOLE NONLINEAR ACOUSTICS MEASUREMENTS IN ROCK FORMATIONS USING DYNAMIC ACOUSTIC ELASTICITY AND TIME REVERSAL

(71) Applicants: TRIAD NATIONAL SECURITY, LLC, Los Alamos, NM (US); CHEVRON U.S.A. INC., San Ramon, CA (US)

(72) Inventors: Harvey Edwin Goodman, Houston, TX (US); Timothy James Ulrich, II, Los Alamos, NM (US); Peter Roberts, Los Alamos, NM (US); Marcel C. Remillieux, Los Alamos, NM (US); Paul Allan Johnson, Santa Fe, NM (US); Pierre-Yves Le Bas, Los Alamos, NM (US); Robert A. Guyer, Los Alamos, NM (US)

(73) Assignees: TRIAD NATIONAL SECURITY, LLC, Los Alamos, NM (US); CHEVRON U.S.A. INC., San Ramon, CA (US)

(*) Notice: Subject to any disclaimer, the term of this patent is extended or adjusted under 35 U.S.C. 154(b) by 126 days.

This patent is subject to a terminal disclaimer.

(21) Appl. No.: 16/343,969

(22) PCT Filed: Oct. 24, 2017

(86) PCT No.: PCT/US2017/058160
§ 371 (c)(1),
(2) Date: Apr. 22, 2019

(87) PCT Pub. No.: WO2018/081179
PCT Pub. Date: May 3, 2018

(65) Prior Publication Data
US 2019/0331820 A1    Oct. 31, 2019

Related U.S. Application Data

(60) Provisional application No. 62/462,081, filed on Feb. 22, 2017, provisional application No. 62/411,717, filed on Oct. 24, 2016.

(51) Int. Cl.
*G01V 1/50*     (2006.01)
*E21B 47/18*    (2012.01)
(Continued)

(52) U.S. Cl.
CPC .............. *G01V 1/50* (2013.01); *E21B 47/107* (2020.05); *E21B 47/18* (2013.01); *G01V 1/306* (2013.01);
(Continued)

(58) Field of Classification Search
CPC .. G01V 1/50; G01V 1/306; G01V 2210/6248; G01V 2210/6222; E21B 47/107; E21B 47/18
See application file for complete search history.

(56) References Cited

U.S. PATENT DOCUMENTS 5,398,215 A    3/1995    Sinha
5,475,650 A    12/1995   Sinha
(Continued)

FOREIGN PATENT DOCUMENTS

EP    2622379    8/2013
GB    2288236    10/1995

*Primary Examiner* — Ian J Lobo
(74) *Attorney, Agent, or Firm* — Esplin & Associates, PC

(57) ABSTRACT

Apparatus and methods for measurement of pore pressure in rock formations through an open, or cemented and/or cased, borehole are described. Such measurements are achieved using the Dynamic Acoustic Elasticity (DAE) method for (Continued)

characterizing nonlinear parameters by perturbing a selected rock formation volume with a High Amplitude, Low Frequency (HALF) acoustic strain wave, and probing this volume using a Low Amplitude, High Frequency (LAHF) acoustic wave. Time reversal techniques may be employed for focusing acoustic energy Into the formation in the vicinity of the pipe or open hole.

21 Claims, 11 Drawing Sheets

(51) Int. Cl.
     *G01V 1/30*       (2006.01)
     *E21B 47/107*    (2012.01)

(52) U.S. Cl.
     CPC ............... *G01V 2210/6222* (2013.01); *G01V 2210/6248* (2013.01)

(56) References Cited

U.S. PATENT DOCUMENTS

| | | | |
|---|---|---|---|
| 7,954,595 B1 * | 6/2011 | Kalinski | G01V 1/181 |
| | | | 181/104 |
| 9,223,039 B2 * | 12/2015 | Vu | A61P 35/00 |
| 2010/0309748 A1 | 12/2010 | Tang | |
| 2011/0149685 A1 * | 6/2011 | Kalinski | G01V 1/181 |
| | | | 367/57 |
| 2011/0154901 A1 | 6/2011 | Calle | |
| 2012/0075951 A1 | 3/2012 | Johnson | |
| 2012/0120761 A1 | 5/2012 | Vu | |
| 2013/0116926 A1 | 5/2013 | Rodney | |
| 2019/0250295 A1 * | 8/2019 | Goodman | E21B 47/06 |

* cited by examiner

DOWNHOLE NONLINEAR ACOUSTICS MEASUREMENTS IN ROCK FORMATIONS USING DYNAMIC ACOUSTIC ELASTICITY AND TIME REVERSAL

CROSS-REFERENCE TO RELATED APPLICATIONS

The present application is a U.S. National Stage Application of International Application No. PCT/US2017/058160, filed on 24 Oct. 2017, which claims the benefit of U.S. Provisional Patent Application No. 62/462,081 for "Rock Formations Hysteresis Mapping Derived From Nonlinear Acoustics Measurements For Geomechanics, Engineering & Geophysics Applications" by Harvey E. Goodman et al., which was filed on 22 Feb. 2017, and of U.S. Provisional Patent Application No. 62/411,717 for "Time-Reversed Nonlinear Acoustic Downhole Pore Pressure Measurements" by Harvey E. Goodman et al., which was filed on 24 Oct. 2016, the entire contents of which Patent Applications are hereby specifically incorporated by reference herein for all that they disclose and teach.

STATEMENT REGARDING FEDERAL RIGHTS

This invention was made with government support under Contract No. DE-AC52-06NA25396 awarded by the U.S. Department of Energy. The government has certain rights in the invention.

PARTIES TO JOINT RESEARCH AGREEMENT

The research work described here was performed under a Cooperative Research and Development Agreement (CRADA) between Los Alamos National Laboratory (LANL) and Chevron under the LANL-Chevron Alliance, CRADA number LA05C10518.

BACKGROUND

Pore pressures are the fluid pressures in the pore spaces in porous formations. Knowledge of pore pressure in a formation is valuable for planning drilling operations and for geochemical and geological analyses. The pore pressure gradient is used in drilling for determining mud weight, which is selected based on pore pressure gradient, wellbore stability and fracture gradient prior to setting and cementing a casing. Drilling fluid is then applied in the form of mud pressure to support the wellbore walls for preventing influx and wellbore collapse during drilling. Geological analyses include initial reserve estimation and fluid contact identification.

Presently, formation pore pressure characterization is achieved through direct formation probe contact either in an open hole or through flow testing from perforations after the wellbore has been cased and cemented. Pore pressure may also be measured directly by well production testing with open hole packer isolation.

Investigation of elastic nonlinearity of materials has broad applications, including medical imaging, civil engineering, and geophysics, since elastic nonlinearity is a sensitive measurement of mechanical damage in solids.

The characterization of formation rock nonlinear elasticity including hysteresis properties from borehole-based nonlinear (NL) acoustic measurements enables the determination of complex formation stress and damage for a geological section. In particular, the measurement of NL hysteresis behavior of the reservoir rock undergoing production operations that includes reduction of pore pressure with depletion and the recovery of pore pressure from injection, results in two repeatable stress paths that develop along separate depletion and injection cycles. This difference impacts reservoir stress characterization accuracy as well as formation compressibility assessments. Further, formation compressibility properties that follow depletion versus pressure recovery operations from injection, also impact reservoir recovery forecasts. Ignoring hysteresis effects can result in the misdiagnosis of reservoir elasticity properties and lead to mismanagement of reservoir surveillance assessments that guide in-field drilling and production recovery forecasts.

SUMMARY OF THE INVENTION

To achieve the purposes of the embodiments of the present invention, as embodied and broadly described herein, the method for determining at least one nonlinear hysteretic parameter in a formation through a borehole, hereof includes: generating low frequency, sinusoidal acoustic signal, having a chosen frequency and amplitude focused in a volume surrounding the borehole and effective for generating strain in the volume; transmitting pulsed, high frequency acoustic signals through the volume; measuring signals generated in the formation in the volume relating to particle velocity or particle acceleration in the formation from which the generated strain is determined; and measuring time-of-flight of the pulsed, high frequency acoustic signals through the volume for a known strain; whereby the change of the time-of-flight of the pulsed, high frequency acoustic signals as a function of the generated strain is determined, from which the at least one nonlinear hysteretic parameter is determined.

In another aspect of the embodiments of the present invention for achieving the purposes thereof, as embodied and broadly described herein the apparatus for determining at least one nonlinear hysteretic parameter in a formation through a borehole, hereof includes: at least one transceiver trained to focus time-reversed acoustic signals in a focal volume centered on the borehole; a probe source comprising a transmitting transducer for transmitting high frequency acoustic pulses into the focal volume; a receiver comprising a receiving transducer for receiving the high frequency acoustic pulses transmitted by the probe source, from the focal volume; a signal processor for measuring the time-of-flight of the received high frequency acoustic pulses; and a non-contact vibrometer or contact accelerometer disposed in the borehole for measuring particle velocity or particle acceleration, from which the strain in the volume is determined, whereby the at least one nonlinear hysteretic parameter is determined.

Benefits and advantages of embodiments of the present invention include, but are not limited to, providing an apparatus and method for measuring pore pressure in a rock formation in cased and open hole environments without direct contact with the formation, wherein the borehole mud weight useful for preventing borehole fracture and collapse can be determined, and formation oil in place can be calculated.

DETAILED DESCRIPTION OF THE INVENTION

Figure 1A:
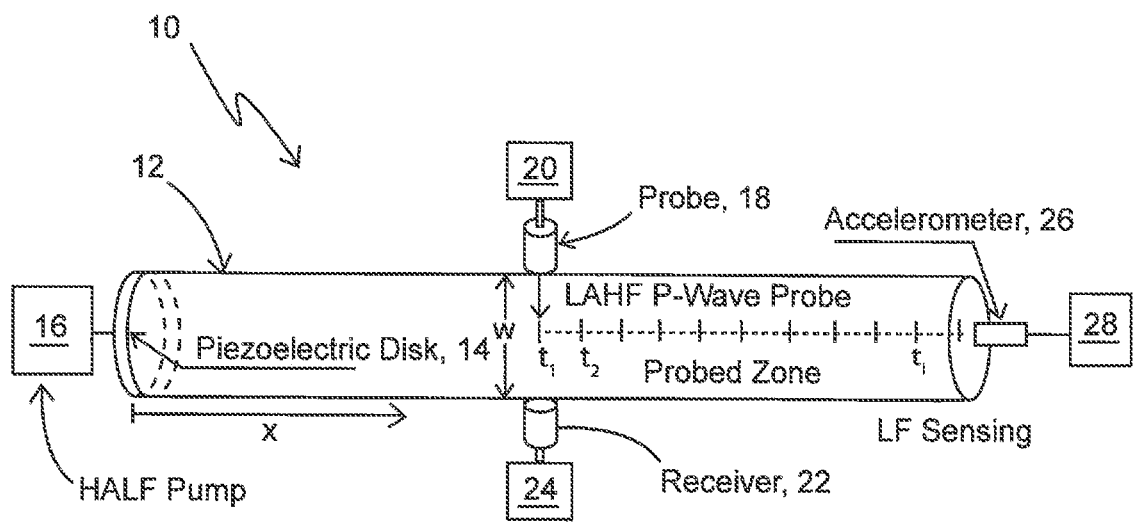
FIG. 1A is a schematic representation of a laboratory apparatus for Dynamic Acoustic Elasticity measurements in a cylindrical sandstone bar.

Briefly, the present invention includes the measurement of formation pore pressure either through a pipe after a well is cemented and/or cased, or in an open hole, thereby eliminating direct contact with the formation. This may be accomplished by using the Dynamic Acoustic Elasticity (DAE) method for characterizing nonlinear parameters by perturbing a selected rock formation region with a High Amplitude, Low Frequency (HALF) acoustic strain wave, and probing this region with a Low Amplitude, High Frequency (LAHF) acoustic wave. Accurate values for the pore pressure in a formation are valuable for the prediction of gas/water contacts, which permit more accurate location of hydrocarbons in the formation, permit the borehole mud weight useful for preventing borehole fracture and collapse to be determined, and formation oil in place to be calculated.

A. Measurement of Pore Pressure:

The change in wave speed as the HALF induced strain field oscillation propagates through the formation is linked to the nonlinear elastic parameters $\alpha$, $\beta$, $\delta$, and A of the pore pressure. The modulation of the time of flight of LAHF probe pulses by the imposed acoustic (HALF or pump) changes in the formation strain are measured. The perturbations in the formation caused by the pump are sufficiently long to permit many probe pulses to be sent at different times in the pump cycle, typically hundreds or thousands of probe pulses for a 0.5 s to 1 s pump pulse. Effective probe pulses are sufficiently short to be resolvable without interfering with each other so that the relative timing of the arrival of the pulses can readily be measured.

Frequency mixing and resonance-based nonlinear ultrasonic measurements, where ultrasonic or acoustic waves propagate through a statically stressed specimen, permit extraction of average variations of modulus and attenuation versus strain level (generally only compressive), but by contrast require static strain levels>$10^{-4}$ to be property measured.

The following is a short description of DAE measurements which generate "butterfly" shapes from which the parameters $\alpha$, $\beta$, $\delta$, and K may be determined.

In a DAE measurement a "pump" strain field, characterized by the amplitude of the pump strain $A_{pump}$, is established in the sample. At $t_i$ the pump strain in the sample is given by $$\varepsilon_{pump}(t_i) = A_{pump} \sin(\omega_{pump} t_i). \quad (1)$$

The elastic state of the sample at $t_i$ is inspected with a low amplitude "probe" pulse that crosses the strain field of the sample at time $t_i$. In crossing the sample at $t_i$ the probe pulse senses the sample experiencing strain field $\varepsilon_{pump}(t_i)$. The time for the probe pulse to cross the sample at $t_i$ is $t_{cross}(\varepsilon_{pump}(t_i))$. The quantity of interest is the change in crossing time brought about by the pump strain, that is, $$\Delta t_i = t_{cross}(\varepsilon_{pump}(t_i)) - t_{cross}(0) = \omega/c_i - \omega/c_0 \approx (\omega/c_0) \cdot \Delta c_i/c_0 \quad (2)$$

or $$\Delta c_i/c_0 = -\Delta t_i/t_0, t_0 = \omega/c_0, \quad (3)$$

where $\omega$ is the length of the path the probe pulse traverses, $c_i = c(\varepsilon_{pump}(t_i))$, and $c_0 = c(\varepsilon_{pump} = 0)$. The probe pulse is directed across the sample at all possible phases of the pump strain. The change in crossing time or the change in C is measured as a function of the pump strain at the time of crossing, $\Delta c/c_0$ vs $\varepsilon_{pump}$.

Data includes $\Delta c/c_0$ (plotted on the y-axis) as a function of the pump strain field ($\varepsilon_p$) (plotted on the x-axis). The pump strain is of order 5µ-strain, and the velocity shifts are negative and of order $2 \times 10^{-3}$. The velocity shift has a negative DC value of order $10^{-3}$. The shift in velocity is to be represented as a function of the pump strain (denoted here as $\varepsilon_p$) in the form:

$$\Delta c(\varepsilon_p)/c_0 = \frac{1}{2}[\alpha A_P + \beta(\varepsilon_p) + \delta(\varepsilon_p)^2 + A(\varepsilon_p)], \quad (4)$$

where $\alpha A_P$ is the intercept that depends on the amplitude the pump strain, $A_P$, $\beta$ is the coefficient of ($\varepsilon_p$), $\delta$ is the coefficient of $(\varepsilon_p)^2$, and $A(\varepsilon_p)$ represents a function related to the hysteric component of $\Delta c/c_0$. $\alpha A_P$ is the intercept that depends, not on the instantaneous pump strain, but on the amplitude of the pump strain, $A_P$ (See, Eq. (1) hereof). $\alpha A_P$ is found as the average of all of the measured values of $\Delta c/c_0$. For the measured data set, $\alpha A_P \approx -1.1 \times 10^{-3}$.

Reference will now be made in detail to the present embodiments of the invention, examples of which are illustrated in the accompanying drawings. In the FIGURES, similar structure will be identified using identical reference characters. It will be understood that the FIGURES are for the purpose of describing particular embodiments of the invention and are not intended to limit the invention thereto. Turning now to FIG. 1A, a laboratory apparatus, 10, for DAE measurements is illustrated. Cylindrical bar, 12, of Berea sandstone having a length of 305.5 mm, a diameter, $\omega$ of 25.8 mm, a density of 2054 kg/m$^3$ and an unperturbed sound speed, $c_0$ of 1916 m/s, was suspended from strings or wires to simulate free boundary conditions. Piezoelectric disk, 14, driven by High Amplitude, Low Frequency (HALF) acoustic source, 16, generates compression waves in bar 12, which are interrogated by transmitting piezoelectric probe transducer, 18, driven by Low Amplitude, High Frequency (LAHF) acoustic source, 20 and receiving transducer, 22, having associated receiving electronics, 24. Non-contact vibrometer, 26, having controlling and receiving electronics, 28, measures low frequency movement of bar 12 at the far end thereof from HALF pump 14. A laser vibrometer was employed. A contact piezoelectric transducer-based accelerometer may also be used. $t_{cross}(t_i)=\omega/c(\varepsilon_{pump}(t_i))$, the time it takes an acoustic pulse from probe transducer 18 to cross the diameter $\omega$ of bar 12 at various locations, t along the length thereof, is measured as a function of the strain generated in bar 12 by HALF acoustic pump 16, as LAHF source 20 and receiving transducer 22 are moved to various positions $t_i$ along bar 12. Typically, ~3 kHz (i.e., the fundamental resonance) was used for the pump for bench top studies (50 Hz to 10 kHz as a range). For formation studies 1-5 kHz may be used in order to achieve appropriate penetration (~1 m wavelength). In general $10^{-5}$ to $10^{-4}$ strain amplitude is achieved with the pump, but the actual applied pump power varies with the source. Probe frequency was approximately 500 kHz (100 kHz to 1 MHz as a range).

Figure 1B:
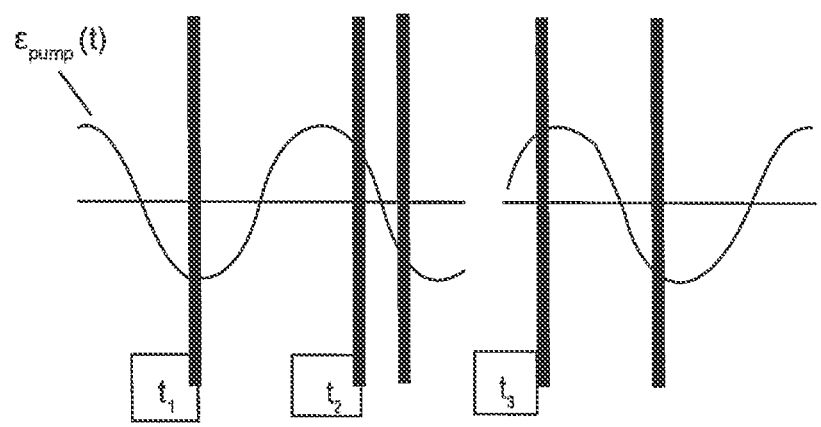
FIG. 1B shows various phases of the pump strain applied to the bar.
Figure 1C:
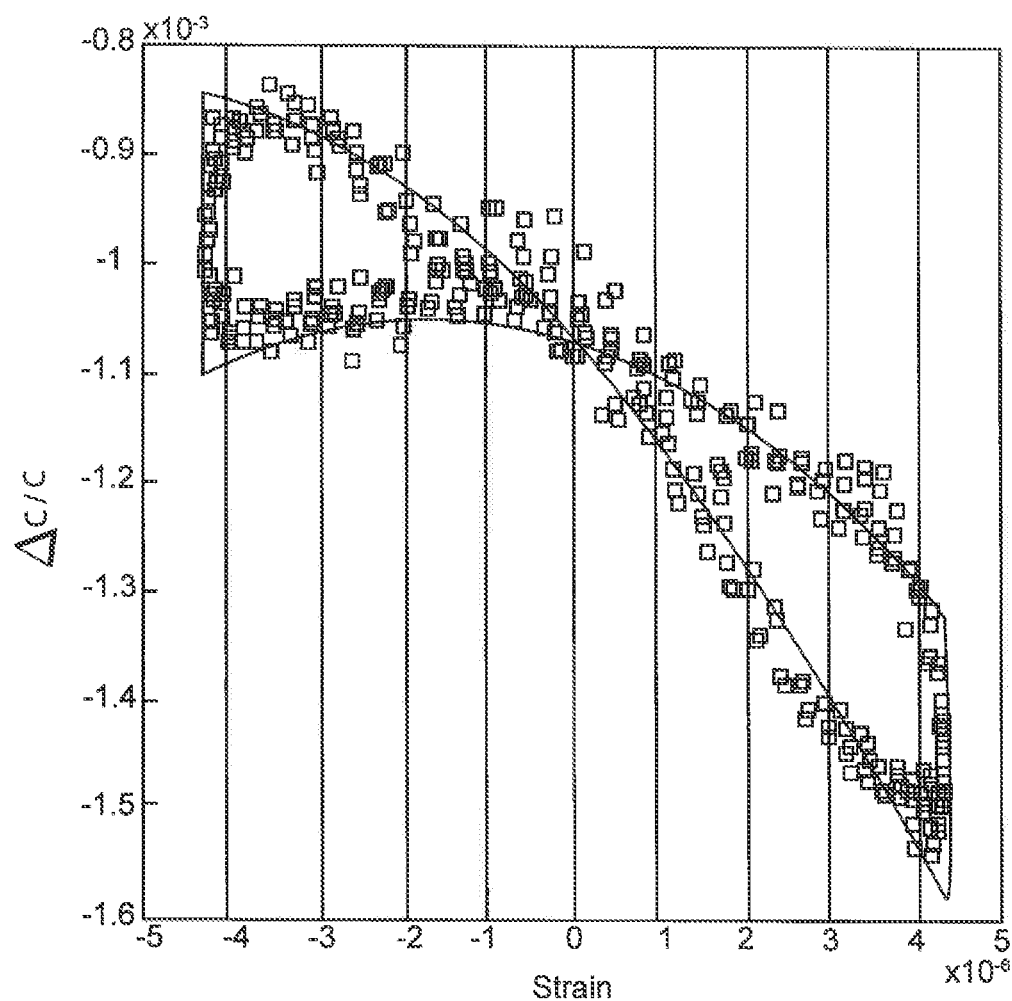
FIG. 1C is a graph of $\Delta c(\varepsilon_p)/c_0$ as a function of strain, $\varepsilon_p$, generated by a piezoelectric transducer having the waveform shown in FIG. 1B.

FIG. 1B illustrates various phases of the pump strain in bar 12, and FIG. 1C is a graph of $\Delta c(\varepsilon_p)/c_0$ as a function of strain, $\varepsilon_p$, generated by pump 16 in bar 12. Strain levels may be between $10^{-8}$ and $10^{-5}$ for such measurements, and the sample is interrogated under both compression and tension, thereby allowing elastic response over a complete dynamic stress cycle to be obtained.

Figure 2:
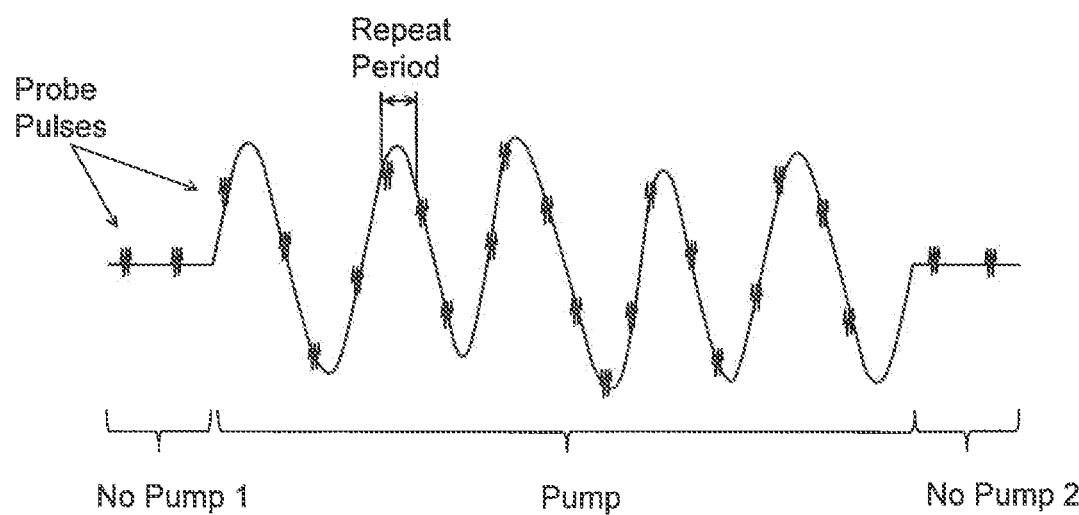
FIG. 2 is an illustration of the pump/probe method of the present invention, showing a periodic pump signal being applied to a formation, which is then probed using a pulsed probe signal.
Figures 3A, 3B:
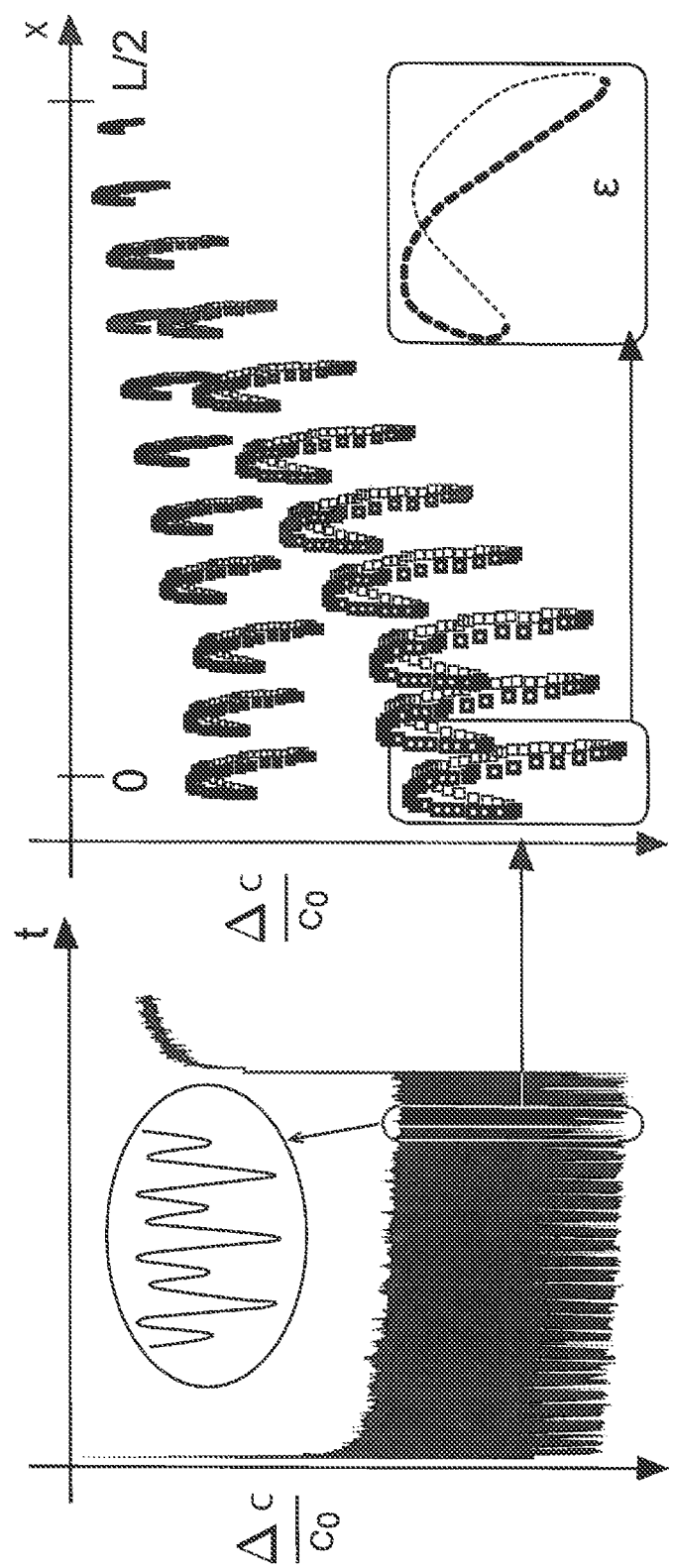
FIG. 3A is a graph of $\Delta c(\varepsilon_p)/c_0$ as a function of time.
FIG. 3B is a graph of $\Delta c(\varepsilon_p)/c_0$ as a function of strain in a cylindrical sandstone bar as measured from the center of the bar to the free end thereof at 11 positions and for 4 different amplitudes of the applied pump transducer.
Figure 4:
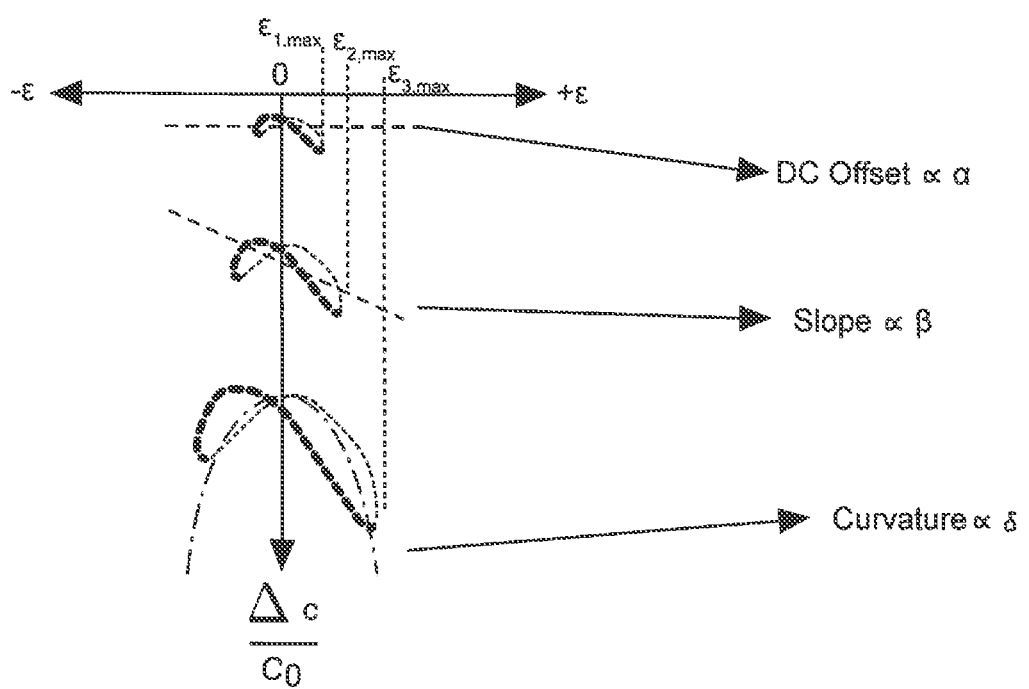
FIG. 4 illustrates the relationship between the parameters $\alpha$, $\beta$, and $\delta$ of the pore pressure, and the characteristics of the generated "butterfly" curves ($\Delta c(\varepsilon_p)/c_0$ as a function of strain, $\varepsilon_p$).

The nonlinear elastic parameters in Eq. 4 above depend on the change in acoustic wave speed as a function of formation strain. This change in wave speed as a function of strain is fit to a quadratic polynomial with the coefficients used to extract $\alpha$, $\beta$, and $\delta$. The details of the data analysis may be found in a paper by J. Riviere et al., Journal of Applied Physics 114, 054905 (2013). The area of the loops (hysteresis) as a function of strain, $\varepsilon_p$(max), can also be used, and is proportional to $\alpha$. FIG. 2 is an illustration of the pump/probe method of the present invention, while FIG. 3A is a graph of $\Delta c(p)/c_0$ as a function of time, whereas FIG. 3B is a graph of $\Delta c(\varepsilon_p)/c_0$ as a function of strain in the cylindrical sandstone bar. Measurements are made from the center of the bar to the free end thereof at 11 positions and for 4 different amplitudes of the applied pump transducer. FIG. 4 illustrates the relationship between the parameters $\alpha$, $\beta$, and $\delta$ and the characteristics of the generated "butterfly" curves ($\Delta c(\varepsilon_p)/c_0$ as a function of strain, $\varepsilon_p$).

Figure 5:
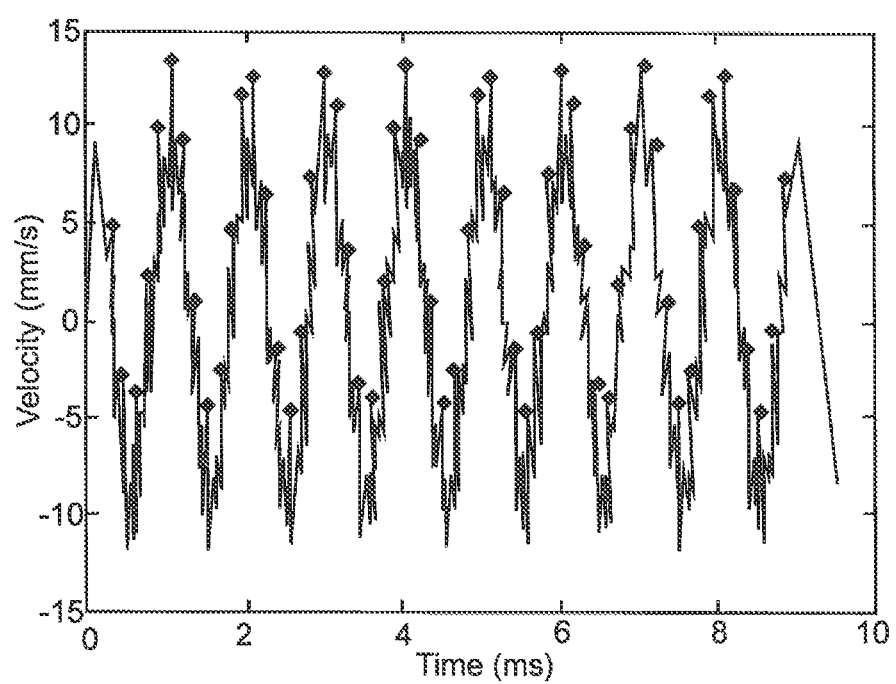
FIG. 5 is a graph of the particle velocity measured by a non-contact accelerometer at the free end of the sandstone bar, as a function of time.

FIG. 5 is a graph of the particle velocity measured by the non-contact accelerometer 26 (FIG. 1), as a function of time.

Nonlinear materials exhibit a nonlinear stress-strain relation which can be probed by acoustic waves, leading to pressure-specific acoustic signatures. Harmonics of the incident acoustic frequencies are created when the acoustic waves are focused. The effective pressure in a formation may be written as, $$P_{\mathit{eff}} = \sigma - bP \tag{5}$$

where $\sigma$ is the confining pressure, P is the pore pressure, and b is the Blot coefficient (typically 0.4-0.9 in rock). The effective pressure can also be described by a nonlinear stress-strain relationship, $$P_{\mathit{eff}} = K[1 - \beta\varepsilon - \delta\varepsilon^2]\varepsilon + K\frac{\alpha}{2}[((\Delta\varepsilon)^2 - \varepsilon^2)\mathrm{sign}(\dot{\varepsilon}) - 2(\Delta\varepsilon)\varepsilon] \tag{6}$$

where K is the linear stiffness constant, $\varepsilon$ is the strain, $\Delta\varepsilon$ is the strain amplitude, $\dot{\varepsilon}$ denotes the partial derivative with respect to time, sign is a function returning the sign (positive or negative) of the argument, $\beta$ and $\delta$ are combinations of third- and fourth-order elastic constants representing the acoustoelasticity (quadratic and cubic classical nonlinearity), and the parameter $\alpha$ relates to the strength of the hysteresis, according to the Preisach-Mayergoyz model of elasticity. See, e.g., K. R. McCall et al., "A new theoretical paradigm to describe hysteresis, discrete memory and nonlinear elastic wave propagation in rock," *Nonlin. Proc. Geophys.* 3, 89-101 (1996), R. A. Guyer et al., "Quantitative implementation of Preisach-Mayergoyz space to find static and dynamic elastic moduli in rock," *J. Geophys. Res.* 102(B3), 5281-5293 (1997), and G. Douglas Meegan, Jr. et al., "Observations Of Nonlinear Elastic Wave Behavior In Sandstone," J. Acoust. Soc. Am. 94, (1993) 3387-3391.

As described above, the parameters $\alpha$, $\beta$, and $\delta$ may be obtained from plots of ($\Delta c(\varepsilon_p)/c_0$ as a function of strain, $\varepsilon_p$. In what follows, $\Delta c(\varepsilon_p)/c_0$ will be replaced by $\Delta C/C_0$, and $\varepsilon_p$ will be replaced by $\varepsilon$. $\alpha$ is given by:

$$\alpha = \frac{\Delta C}{C_0}\frac{1}{\varepsilon} \tag{7}$$

$$\varepsilon = \frac{\ddot{u}}{2\pi f C_0},$$

where $C_0$ is the linear velocity and C the perturbed velocity. The second derivative of u with respect to t is the particle acceleration that is frequently measured, f is the wave fundamental frequency, and $\varepsilon$ is the strain measured at frequency f in the focal region as the signal source amplitude is increase. Alternatively, alpha can be obtained from the third harmonic amplitude also when wave amplitudes are large. In the following alpha, beta and delta are shown.

$$\alpha = \frac{c_0^2}{L}\frac{\ddot{u}_{3f}}{\ddot{u}_{1f}^2} \tag{8}$$

$$\beta = \frac{c_0^2}{L}\frac{\ddot{u}_{2f}}{\ddot{u}_{1f}^2}$$

$$\delta = \frac{\omega c_0^3}{L}\frac{\ddot{u}_{3f}}{\ddot{u}_{1f}^3}$$

where L is the wavelength of the fundamental frequency divided by two, equivalent to the radius of the focal region, the second derivative of u with respect to time, 3f, is the third harmonic acceleration amplitude, the second derivative of u with respect to time, 2f, is the second harmonic acceleration amplitude, the second derivative of u with respect to time, 1f, is the fundamental harmonic acceleration amplitude, and $\omega=2\pi f$, where f is the fundamental frequency.

Hysteresis is a component that is introduced to the pore pressure determination. The present DAE measurements illustrate that hysteresis does consistently follow specific pore pressure paths. Therefore, pore pressure and accompanying stress can be predicted along with the elastic moduli leading to formation compressibility, as will be explained in greater detail below.

Time reversal is a method for focusing acoustic waves such that intense (non-damaging) sound amplitudes are generated in a volume to induce local nonlinearities. As an example, waves may be introduced into a borehole using a piezoelectric transceiver. The waves are recorded on another transceiver located elsewhere in the borehole. The recorded waves are then reversed in time, and emitted from the detecting transceivers, where they follow their forward wave paths backwards-in-space, and coalesce, focusing at the original source transceiver, since the elastic wave equation is symmetric with respect to time. That is, the wave equation may be evaluated either forward or backward in time, the physics being identical. Amplitudes at the time-reversed focus are large due to conservation of energy, since all of the energy contained in the long-duration scattered-signal is collapsed onto the focal point in space and time. Since wave amplitudes are largest at the focus, the local response may be nonlinear, but only at the focus.

Figure 6:
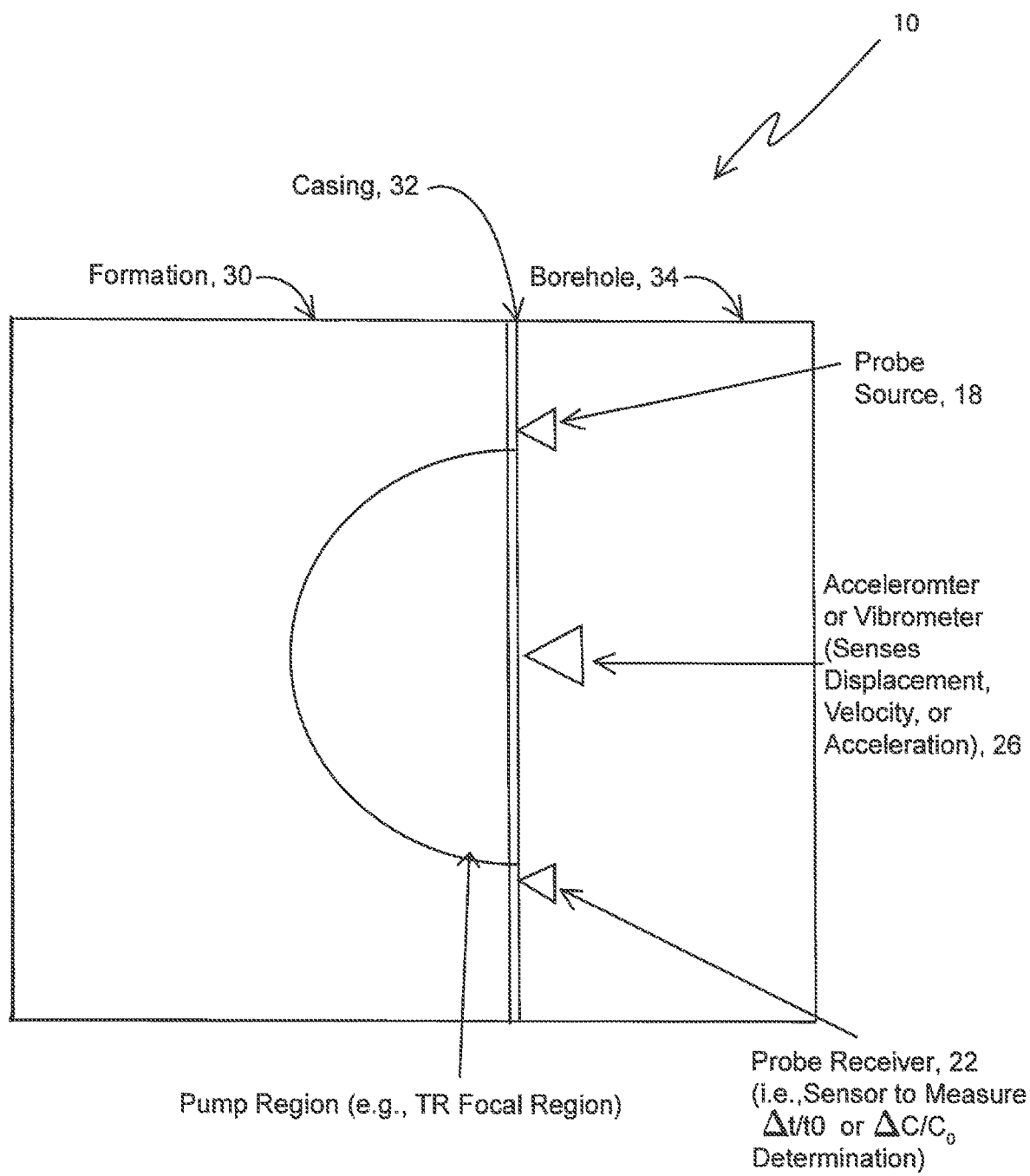
FIG. 6 is a schematic representation of an embodiment of the present apparatus for measuring downhole pore pressure based on Dynamic Acoustic Elasticity.

FIG. 6 is a schematic representation of an embodiment of the present apparatus, 10, for measuring downhole pore pressure based on DAE. As will be described in FIG. 7, below, TR NEWS (Time Reversal Nonlinear Elastic Wave Spectroscopy) or a phased array may be used to generate the strain in formation 30. LAHF formation probe source, 18, which generates pulses having sinusoidal frequencies between 200 kHz and 1.5 MHz, and LAHF detector 22, which together determine the delay in the velocity of generated LAHF pulses resulting from the strain generated in the formation, using signal processor, 23, are placed in contact with casing, 32, surrounding borehole, 34. Steel casings are typically used for this purpose, and do not significantly distort acoustic signals generated in the formation. At 50 cm to 1 m acoustic wavelengths, attenuation by a 0.25" steel casing, is small, but can be corrected for, since steel is not attenuative when compared to rock. As mentioned above, the present DAE measurements can likewise be performed in an open borehole (no casing or cement), and also ahead of the bit while drilling. Non-contact vibrometer, 26, (or contact accelerometer) which is a calibrated sensor for determining the displacement, velocity or acceleration, respectively, of the particles in the formation as a result of the generated strain, is also placed in casing, 32, surrounding borehole, 34. Measurements of $\Delta C/C_0$ as a function of $\varepsilon$ can be made, from which the pore pressure can be determined. For bench top experiments laser vibrometers, which are non-contact, were employed. Accelerometers are piezoelectric-based sensors and therefore are contact sensors. Piezoelectric contact transducers as well as an LVDT (linear variable differential transformer) which is a displacement sensor, were used for measurements of the pump amplitude in the laboratory.

Use of a laser vibrometer in the Doppler mode permits particle velocity to be measured directly, while in the interferometer mode, particle displacement is directly measured. When an accelerometer is used, the particle acceleration is directly measured. The pump strain $\varepsilon$ is determined by dividing the measured dynamic particle velocity (v) by the wave speed (c) in the formation, that is, $\varepsilon=v/c$. the pump signal particle velocities at the sensor are oscillatory, the strain is also oscillatory. Thus, a strain waveform is obtained as a function of time. The times at which the probe pulses are generated are determined such that the strain is known at these times. Those strains are the values plotted on the x-axes, in the FIGURES described above.

Focusing occurs in the rock formation, even though generated within the casing of the borehole. The volume of the focus is determined by the frequency of the time reversed signal. Further, since the TR waves propagate and collapse through the propagation medium, onto the point of focus, the sensors detect the properties, nonlinear and otherwise, of the waves.

The probe signal is applied at a constant time spacing. The time it takes for the probe pulse to travel to the probe detector can be directly measured by knowing the timing and spacing of the probe emitter/detector pair. As the pump disturbs the formation, the probe signal may be advanced or retarded in time. This can be extracted by continually measuring the probe. Distances and materials do not change during the measurement, so a change in time can be directly related to a change in velocity. $\Delta C/C_0$ is measured from the timing relative to a reference signal as the probe pulse travels through the radius of the TR focus. Strain $\varepsilon$ is measured by the particle velocity divided by the wave speed. Particle velocity is directly measured by the calibrated sensor at the focal point. Alternatively, the sensor measures particle acceleration and a correction made to generate the particle velocity. Note that the vibrometer measurements are non-contact, while accelerator measurements are contact measurements.

Figure 7:
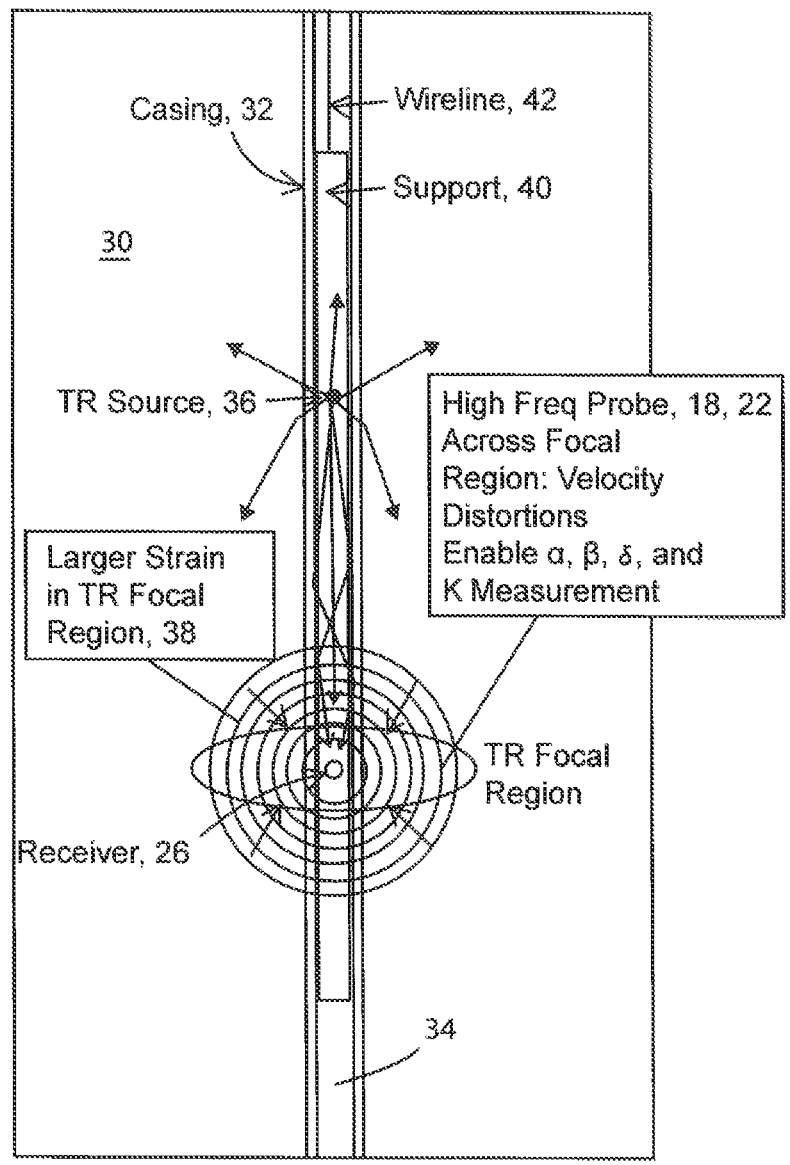
FIG. 7 is a schematic representation of an embodiment of the present apparatus for measuring downhole pore pressured based on Dynamic Acoustic Elasticity, where the strain in the formation is generated using Time Reversal Nonlinear Elastic Wave Spectroscopy.

FIG. 7 is a schematic representation of an embodiment of the present apparatus for measuring downhole pore pressured based on Dynamic Acoustic Elasticity (DAE), where the strain in the formation is generated using Time Reversal Nonlinear Elastic Wave Spectroscopy. As stated above, phased arrays of acoustic sources may also be utilized. For a phased array, waves are directed into a focal region, which is difficult in a rock formation because of scattering, whereas for time reversal, the response due to the scattering is measured directly and used to focus the energy. Scattering by the formation and casing is built into the time reversal process, and is automatically accounted for.

The DAE measurement defines hysteresis for the rock surrounding the borehole. Calculations regarding likely source frequencies for the probing part of the DAE measurement illustrate that the measurement is taken about 2 to 3 feet or more into the formation beyond any near hole stress influence. Therefore, the DAE measurement can be treated as a scalar value useful for characterizing stress with pressure performance for the reservoir. Without the present technology, core samples are required to obtain this information.

In accordance with the time-reversal process, acoustic signals from source, 36, are trained to focus into focal region, 38. Only one source is shown, but many sources may be used to increase the signal intensity, thereby increasing the strain applied to the formation. The phase relationships among the waves permit the constructive interference thereof resulting in space and time focusing effective for inducing a nonlinear strain in the formation 30 focal volume 38. As briefly mentioned above, if the sound velocity in formation 30 is known (as is generally the situation) using the relationship for the wavelength, λ=velocity/frequency, the diameter of the focal spot measured at the half maximum value is equal to one-half of the dominant wavelength. See, e.g., "Depth Profile Of A Time-Reversal Focus In An Elastic Solid," by Marcel C. Remillieux et al., Ultrasonics 58 (2015) 60-66. Time Reversal Source support, 40, is adapted to fit in borehole 34 having an inner diameter of 6 in., as an example, and may be constructed of sturdy plastics capable of withstanding high temperatures and caustic environments.

In operation, the tool of FIG. 7 may be employed as follows:

1. Lower the tool into a cased borehole;
2. Focus a chosen amplitude and frequency of ultrasonic energy through the borehole casing using time reversal or phased arrays as the HALF;
3. Record the time delay of the probe signal pulses, LAHF, focused in the same region as the HALF, as a function of the strain ε in the formation measured at the receiver in the bore hole;
4. Vary the source amplitude and frequency, and repeat measurements at the receiver;
5. Measure $\Delta C/C_0$ at the various source amplitudes and frequencies to determine α, β, and δ; and
6. Determine the pore pressure in the HALF region.

Figure 8:
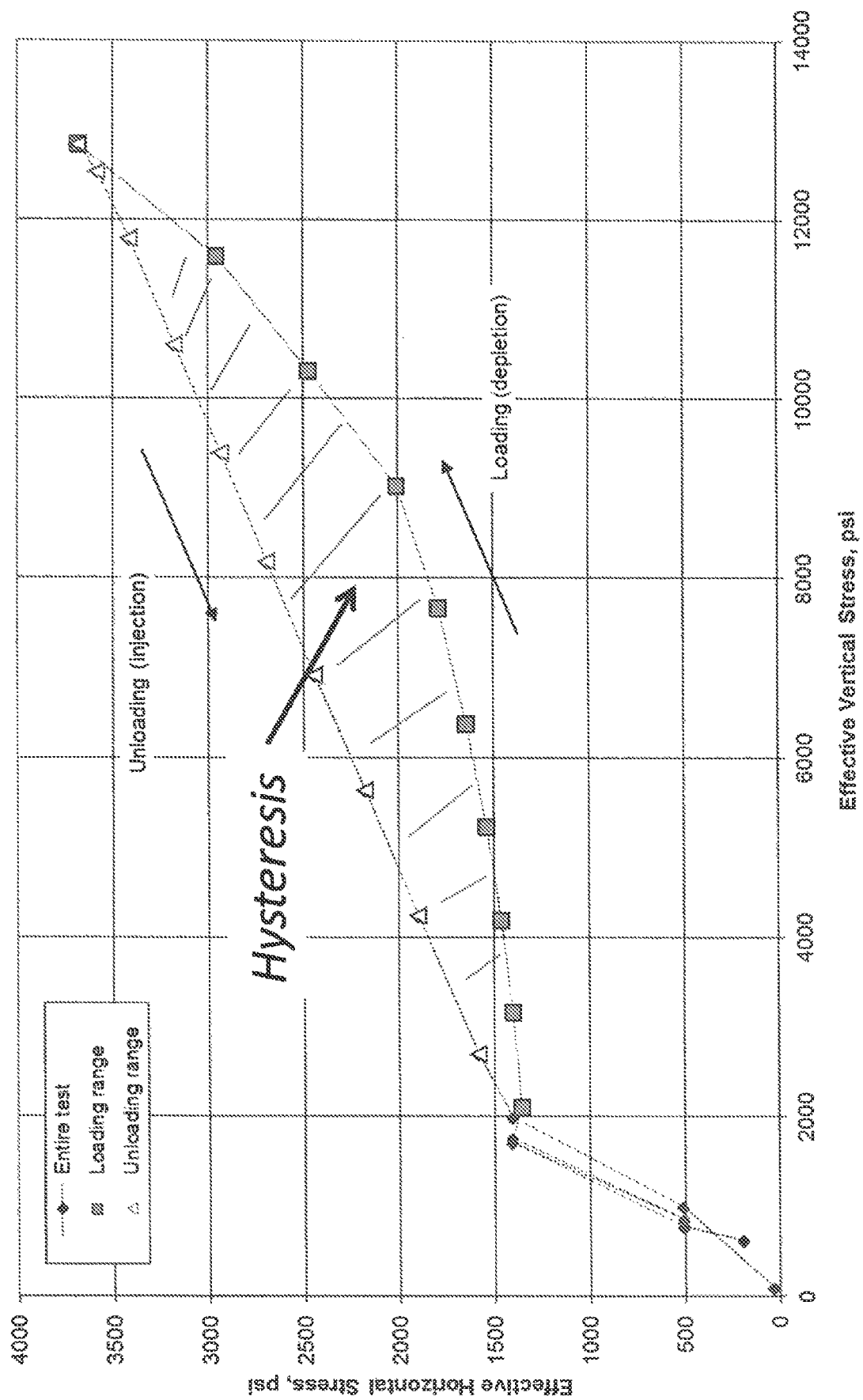
FIG. 8 is a graph of the effective vertical stress of a rock formation as a function of the effective horizontal (or lateral) stress, the two loading response paths followed during effective stress increase (simulating depletion) and effective stress decrease (simulating injection) being a measure of hysteresis.

B. Determination of Mud Weight:

Embodiments of the present invention relate nonlinear acoustics, nonlinear elasticity and hysteresis measurements for characterizing rock formation stress and elasticity behavior known to be strongly linked to reservoir production activities. That is, reservoir pressure reduction defined as depletion, versus reservoir pressure recovery activities by injection of produced water, result in consistent formation stress and elasticity responses that follow the pressure decline or pressure recovery cycle. FIG. 8 illustrates the pressure history effect on laboratory measurements of stresses on sandstone core from an offshore North Sea reservoir. Effective vertical stress (equivalent to overburden stress) is plotted against effective horizontal stress (equivalent to lateral stress due to the overburden loading). As the sandstone reservoir is loading (simulating depletion due to pore pressure reduction) and unloading (simulating pore pressure increase from injection), the effective horizontal stress necessary to keep changes in lateral strain constant follows a different and repeatable stress path. The area between these two stress paths defines the hysteresis.

The dependence of borehole stability performance is related to subsurface stress magnitude. When a well is drilled, the rock stresses in the vicinity of the wellbore are redistributed as the support originally offered by the drilled out rock is replaced by the hydraulic pressure of the mud. Stress concentrations at the borehole wall, often described as tangential stresses, can exceed the strength of the rock to cause hole collapse failure. To compensate for these stress concentrations, borehole fluid pressure is increased during drilling causing the tangential stress level to become smaller. However, if the borehole fluid pressure is increased such that it exceeds the tangential stress concentration, the borehole will fail in tension resulting in the loss of drilling fluid to the rock formation. Thus, drilling fluid pressure management is required, and mud weight is balanced between borehole tensile (fracture) failure and borehole compressive failure or collapse. See, e.g. M. R. McLean and M. A. Addis, "Wellbore Stability: The Effect of Strength Criteria on Mud Weight Recommendations," Society of Petroleum Engineers, SPE 20405, 9-19, (1990).

Boreholes drilled during exploration and development of a field must accommodate the formation stress that builds up at the borehole wall. The magnitude of these stresses depends on the pre-drill in situ stress field and trajectory of the well. When mud weight exceeds the stress magnitude at the bore hole wall, the well fractures and mud is lost to the formation from tensile failure. Conversely, borehole failure in compression occurs when formation strength cannot sustain the low mud weight used during drilling. This failure type often causes hole enlargement and both stress magnitude and formation strength must be known in order to predict this type of hole failure.

Rock formation stress magnitude and orientation in the subsurface is a consequence of gravity loading, or overburden, and tectonic stress induced by fault movement often at the regional scale. However, stress fields found in many geological settings associated with oil and gas accumulations, are often found to be "relaxed" tectonically and assumed to be primarily a result of gravity loading. This stress state will be used to illustrate the effect of subsurface stress on hole stability.

The magnitude of horizontal stresses due to overburden can be calculated using Poisson's ratio ν, Biot's constant, b, overburden stress $\sigma_v$, and pore pressure $P_p$. The minimum horizontal stress, $\sigma_h$, is:

$$\sigma_h = [\nu/(1-\nu)](\sigma_v - bP_p) + bP_p, \text{ where} \tag{9}$$

the portion of total stress borne by the pore fluid is expressed in the ($bP_p$) component of Equ. 9. Biot's constant, b, is the effectiveness of pore fluid in supporting the stress, and is expressed as:

$$b = 1 - (C_m/C_{dry}), \text{ where} \tag{10}$$

$C_m$ is the matrix solid compressibility, and $C_{dry}$ is the compressibility of the bulk drained frame of the rock.

When horizontal stresses are due to overburden stress only (i.e., a normally stressed area), horizontal stresses can be considered equal in magnitude. That is, the maximum horizontal stress $\sigma_H$ equals $\sigma_h$.

For wellbore stability assessment, stress concentrations that form at the wall of the borehole are determined by transforming the orthogonal subsurface stress field to cylindrical coordinates, from which the maximum and minimum stress at the borehole wall can be evaluated. This is necessary to determine the well pressure or mud weight $P_w$ when borehole collapse is initiated using the Mohr-Coulomb failure model. The stress transforms used are summarized in B. S. Aadnoy and M. E. Chenevert, "Stability of Highly Inclined Boreholes", SPE Drilling Engineer, 364-374 (1987).

(i) Borehole Fracture Failure:

For inclined holes deviated by an angle γ from vertical, borehole fracture gradient may be calculated using the method developed by Aadnoy and Chenevert, supra.

$$\text{fracture} = Init_0 + \frac{P_P - 16}{3} \sin^2(\gamma), \text{ where} \tag{11}$$

$$Init_0 = 3\sigma_h - \sigma_H + T_0 - bP_P, \text{ and} \tag{12}$$

$$T_0 = \frac{UCS}{12}, \tag{13}$$

where UCS is the unconfined compressive strength of the rock.

In a vertical wall, γ=0, so that the second term in Equ. 11 is zero, resulting in the Breakdown=$Init_0$.

For ν>0.4, Breakdown=$\sigma_h$. This higher Poisson's ratio indicates that the rock formation is ductile and unable to sustain a high stress concentration at the borehole wall. Consequently, the maximum mud weight the borehole can tolerate before fracturing is the stress minimum for the system $\sigma_h$.

(ii) Mohr-Coulomb Borehole Collapse Failure:

This failure criterion is a two-dimensional formulation. Only the maximum and the minimum principal stress are included in failure determinations. For a vertical well, the Mohr-Coulomb criterion finds the critical wellbore pressure at failure $P_W$, where $$P_W = [3\sigma_H - \sigma_h - UCS]/[[1+[(\mu^2+1)^{1/2}+\mu]^2], \quad (14)$$

where $\mu$ is the coefficient of internal friction, a function of the rock formation friction angle $\phi$ and determined by $\mu$=tan $\phi$. For deviated wells, the stress terms are transposed to the borehole wall to find the maximum and minimum values. Although these stress concentrations are tangential in nature, they are deconvolved to their normal components (principal stresses) such that shear stress is equal to zero. These normal stress maxima and minima values are substituted into the $P_W$ equation above, replacing $\sigma_H$ and $\sigma_h$.

Figure 9:
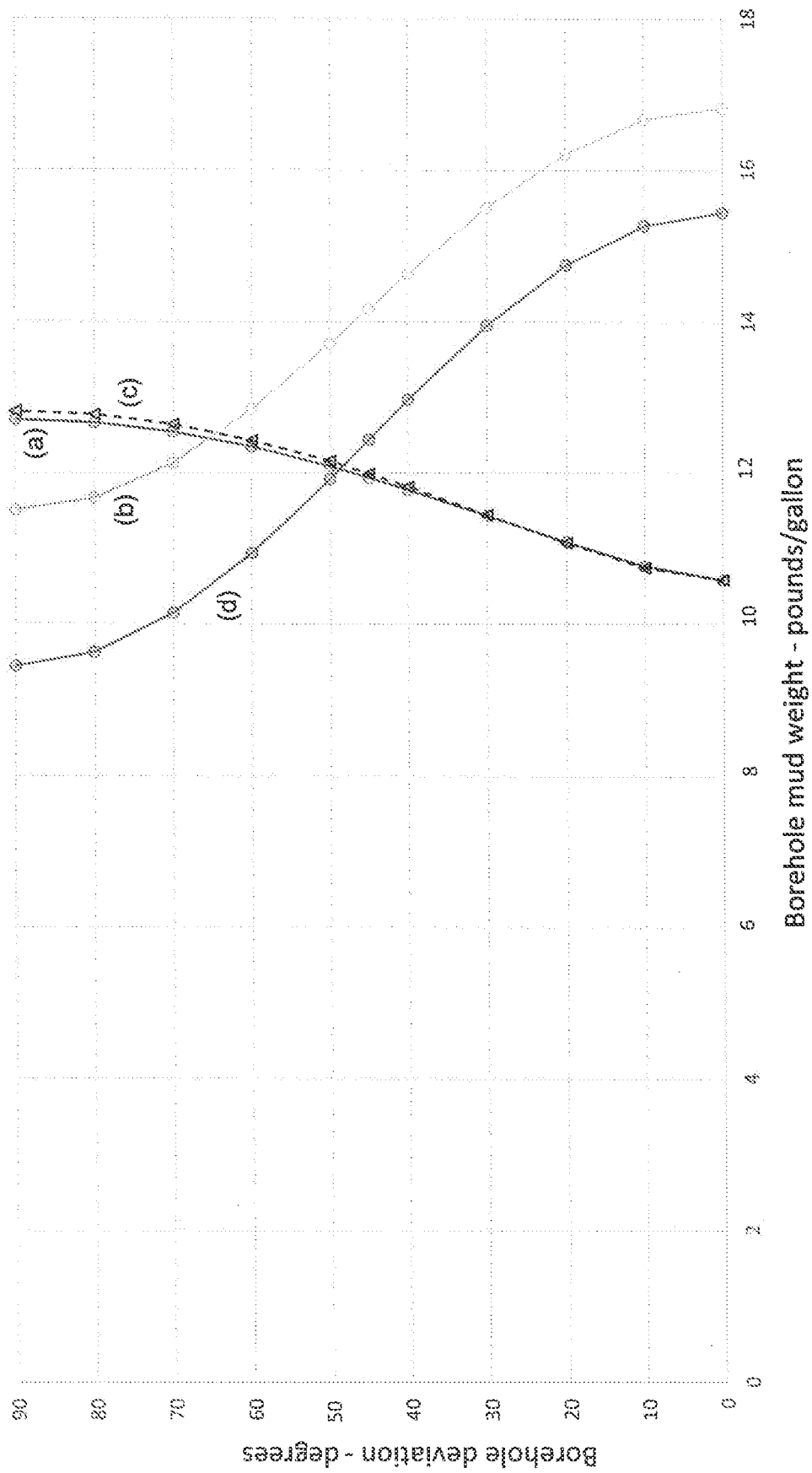
FIG. 9 is a graph of borehole deviation as a function of borehole mud weight, illustrating the impact of hysteresis on tension fracture failure and compression collapse failure, with curve (a) being hole collapse failure calculated using the Mohr-Coulomb failure model for the injection case and 8000 psi axial vertical stress; curve (b) being hole fracture failure for the injection case with 8000 psi effective vertical stress; curve (c) being hole collapse failure using the Mohr-Coulomb failure model for the depletion case with 8000 psi axial vertical stress; and curve (d) being hole fracture failure for the depletion case with 8000 psi effective vertical stress.

For a given pore pressure and horizontal stress magnitude, hole stability behavior will differ markedly depending on the pore pressure history of the reservoir, that is, whether the reservoir pressure with stress follows the depletion path or injection path. For the degree of hysteresis shown in FIG. 8, the impact on borehole stability is illustrated in FIG. 9 for depletion and injection. FIG. 9 is a graph of borehole deviation as a function of borehole mud weight, illustrating the impact of hysteresis on tension fracture failure and compression collapse failure, with curve (a) being hole collapse failure calculated using the Mohr-Coulomb failure model for the injection case and 8000 psi axial vertical stress; curve (b) being hole fracture failure for the injection case with 8000 psi effective vertical stress; curve (c) being hole collapse failure using the Mohr-Coulomb failure model for the depletion case with 8000 psi axial vertical stress; and curve (d) being hole fracture failure for the depletion case with 8000 psi effective vertical stress. The plot displays borehole mud weight in pounds per gallon (ppg) versus borehole deviation in degrees from vertical. Units of ppg are commonly used by the oil industry, noting fresh water gradient is 8.33 ppg (0.433 psi/ft.).

At 0° hole deviation (vertical well) curve (d) fracture failure case for depletion path indicates the fracture gradient is about 15.5 ppg and the collapse gradient is about 10.5 ppg. Therefore, for this case, a vertical well needs mud weight between 10.5 (minimum to prevent collapse failure) and 15.5 ppg (to prevent fracturing failure). This is a wide safe drilling mud weight window. As the hole deviation increases to about 49°, the safe drilling mud weight window closes. This indicates wells deviated more than 49° cannot be drilled safely. That is, mud weight cannot be increased to prevent hole collapse failure (about 12.1 ppg required), without losing mud to the formation from fracturing. The fracture gradient is less than the hole collapse gradient. However, the injection case is more tolerate to deviated well stability since the fracture gradient is greater, the green curve.

The stability calculation was performed using FIG. 8 data when the effective vertical stress equals 8000 psi. This occurs after the reservoir pressure gradient has decreased from the original 16.24 ppg (0.844 psi/ft.) to 10.0 ppg (0.52 psi/ft.). The stress difference seen at identical pore pressure is the result of hysteresis. TABLE 1 shows the formation stress and formation mechanical properties used to generate the stability profile.

TABLE 1

North Sea reservoir borehole stability model input.

| load cycle | Depth ft. | Overbd stress grad ppg | Res press Grad ppg | Max horiz stress grad ppg | Min Horiz stress grad ppg | Comp strth psi | Friction angle degrees | Poissratio | Biot's constant |
|---|---|---|---|---|---|---|---|---|---|
| Loading - Depletion | 14801 | 18.7 | 10.0 | 12.7 | 12.7 | 4158 | 43.4 | 0.186 | 1.0 |
| Unloading - Injection | 14801 | 18.7 | 10.0 | 13.4 | 13.4 | 4158 | 43.4 | 0.186 | 1.0 |

Hole stability estimates shown in FIG. 9 indicate that fracture gradients are strongly impacted by hysteresis compared to borehole collapse failure. This behavior derives from the dependence of borehole fracturing behavior with respect to stress magnitude. Borehole collapse is impacted primarily by formation rock compressive strength. For the case studied, formation compressive strength is considered constant and unaffected by hysteresis.

In other words, the hysteresis term enables us to predict how the formation stress will change as the formation pore pressure undergoes change with production. A large value of a means a larger difference in stress to be expected between the "depletion stress cycle or path" compared to the "injection stress path". Basically, the width of the hysteresis area shown in FIG. 8. The stress values used for FIG. 9 are presented in TABLE 1, where the stress gradients in Cols. 5 and 6 are the values thereof after a 4800 psi reduction reservoir pressure, and $\sigma_H = \sigma_h$. Between the 2 load cycles, there is a difference of 13.4−12.7=0.70 ppg (0.364 psi/ft.) between injection and depletion operations. At a reservoir depth of 14,801 ft., the stress magnitude difference is nearly 5400 psi; (14801×0.364). This difference in stress magnitude significantly influences borehole fracture behavior, but less significantly for borehole collapse failure.

Figure 10:
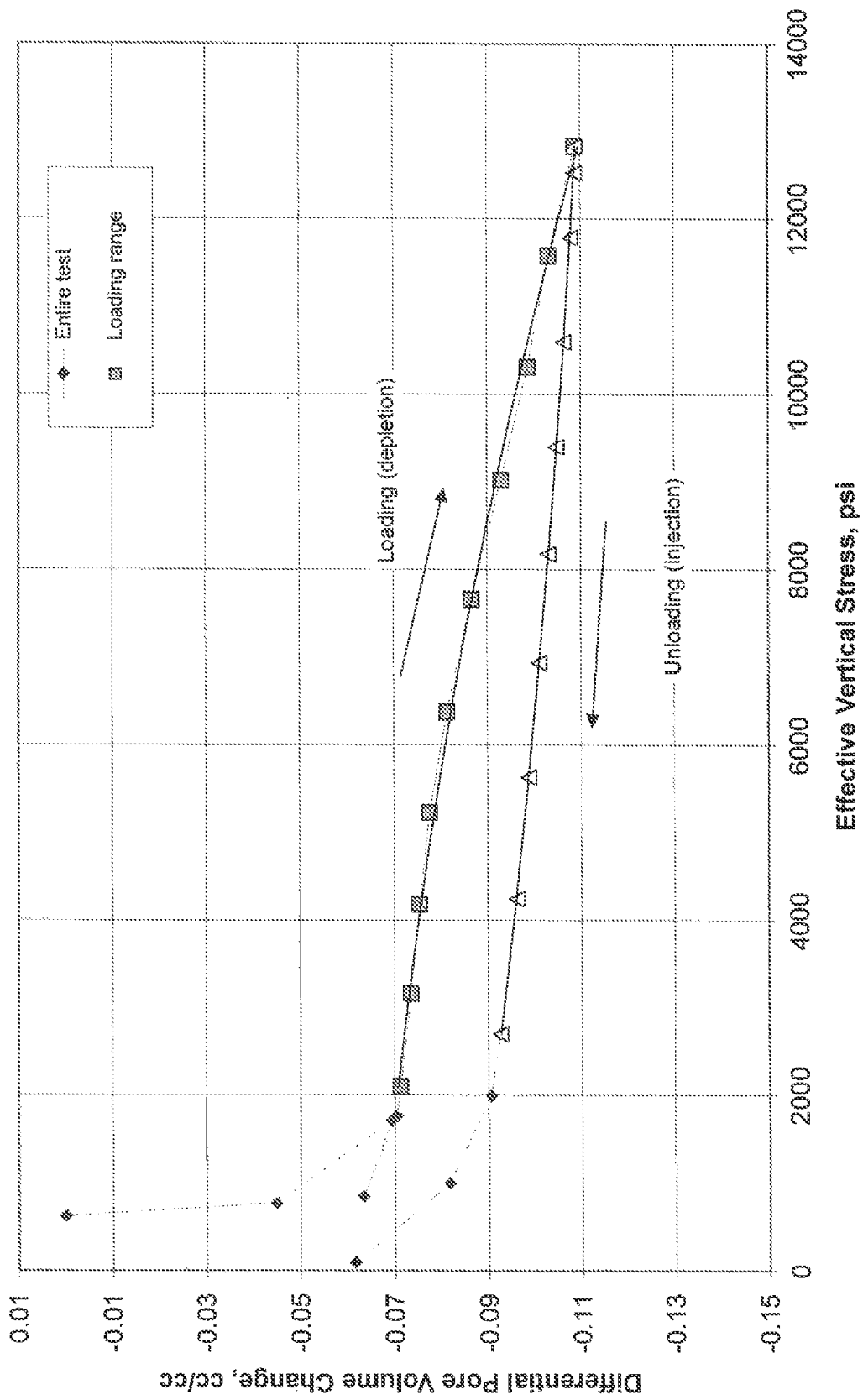
FIG. 10 is a graph of the differential pore volume change as a function of effective vertical stress for a North Sea reservoir.

C. Determination of Reservoir Performance:

(i) Hysteresis Impact on Reservoir Rock Formation Compressibility:

The hysteretic behavior of reservoir rock includes changes in porosity associated with pore pressure loss with depletion and pore pressure recovery from injection. This porosity change results from the rock frame or rock skeleton loading that occurs with pore fluid pressure magnitude. FIG. 10 shows two distinct porosity change paths that are dependent upon either depletion or injection operations. Notice this data set for the same offshore North Sea reservoir shows total porosity restoration will not happen after depletion has occurred.

Pressure changes associated with depletion and injection practice also impact reservoir compressibility. TABLE 2 shows the compressibility changes with stress path for the North Sea reservoir investigated. Reservoir compressibility values according to depletion and injection operations impact oil recovery performance. These reservoir compressibility magnitudes are relatively small when compared with highly compactible chalk in other reservoirs in the North Sea. For example, the Ekofisk field in the Norwegian sector of the North Sea, produces from a chalk formation that exhibits porosities in the range of 25 to 48% with reported rock compressibility as high as 50 to $100\times10^{-6}$ psi$^{-1}$. Thus, for less compressibility reservoirs, the compaction drive mechanism can strongly affect ultimate recovery when the reservoir volume is significant.

TABLE 2

North Sea Reservoir Compressibility Load Path Dependence.

| load cycle | Eff. Vertical Stress Interval, psi | Bulk vol Comp, Cb, cc/cc/psi | Pore Vol Comp, Cp, cc/cc/psi | Uniaxial Bulk Vol Comp, Cbm, cc/cc/psi | Uniaxial Pore Vol Comp, Cpm, cc/cc/psi |
|---|---|---|---|---|---|
| Loading - Depletion | 2100-12900 | 1.31E-06 | 7.15E-06 | 5.55E-07 | 3.46E-06 |
| Unloading - Injection | 12900-2100 | 8.51E-07 | 4.15E-06 | 3.80E-07 | 2.25E-06 |

The effect of reservoir compressibility is discussed in Society of Petroleum Engineers (SPE) sponsored PetroWiki. Rock expansivity $E_f$ is an important parameter affecting oil recovery using material balance analysis to model performance. Reservoir rock expansion occurs when pressure decreases due to production. For high pressure gas reservoirs along the Gulf Coast, rock expansivity of over 8% was measured on core that also showed reservoir porosity decreasing from 16.7% to 15.5%. This rock expansion behavior increases oil recovery from the reservoir as the oil is pushed out of the pore space.

Reservoir rock expansivity is related to rock compressibility by the following relationship:

$$E_f(p)=\int_p^{P^i}cfdp, \quad (15)$$

where cf is the rock compressibility. Cf is related to the instantaneous formation pore volume compressibility by $$cf(p)=1/V_p[\partial V_p/\partial P], \quad (16)$$

where $V_p$ is pore volume and P reservoir pressure. Normally, the pressure dependence of reservoir compressibility cf is determined by core analysis. With the capability to define cf using the present nonlinear acoustic hysteresis measurements, a continuous measurement of this reservoir attribute can be made.

If cf is known as a function of reservoir pressure, then the right side of Equ. 15 can be evaluated numerically. The hysteresis measurement used to define reservoir compressibility behavior with pressure cycle, an example of which is presented in TABLE 2, Col. 4, agrees with field observations that cf is commonly found to vary with reservoir pressure and reservoir production cycle, that is, depletion versus injection.

Once $E_f(p)$ has been defined, the material-balance methods can be applied to estimate original oil in place OOIP and to confirm the reservoir producing mechanism. See, e.g., M. J. Fetkovich et al, "Application of a General Material Balance for High-Pressure Gas Reservoirs," Society of Petroleum Engineers, SPE Journal pages 3-13 (1998), where pore volume compressibility cf is used to account for reservoir rock changes in pore volume with reservoir pressure. In FIG. 2 thereof, a single function is defined in the relationship between pore pressure and pore volume, likely not accounting for hysteresis behavior, however, this was not measured for the reservoir being considered in that article.

Figure 11A:
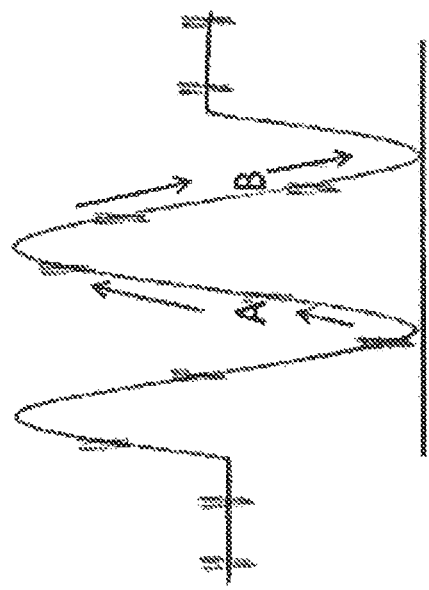
FIG. 11A is a graph of the change in travel time across a formation onto which a strain wave shown in FIG. 11B is applied, illustrating rock formation hysteresis using the present DAE measurement technology.
Figure 11B:
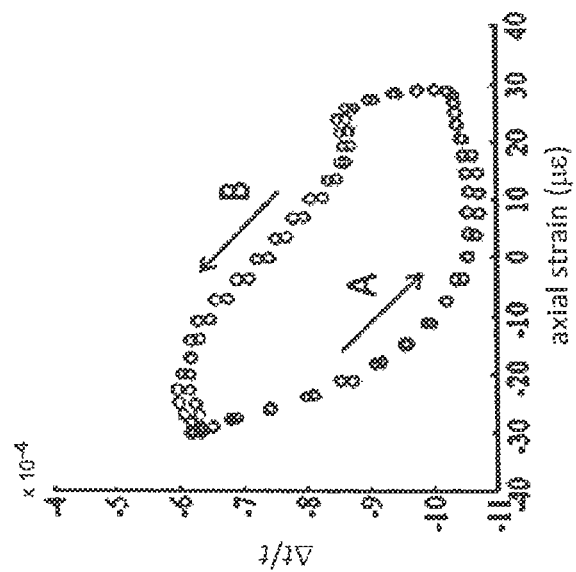

(ii) Measurement of Hysteresis Using Nonlinear Acoustic Techniques in Accordance with the Teachings of Embodiments of the Present Invention:

Hysteresis is displayed in FIG. 11A as illustrated in the graph of the difference in wave speed versus axial strain. The difference in wave speed with increasing (corresponding to reservoir depletion) versus decreasing (corresponding to reservoir injection) strain paths (A and B, respectively) indicates the hysteretic behavior. Wave speed is related to the change in travel time or time-of-flight (TOF) across the specimen during the strain wave progression, as a sinusoidal compressional wave is passed through a sample volume. The measured increasing strain (path A) and decreasing strain decreasing (path B) is shown in FIG. 11B.

An approximation for the general relationship between changes in velocity and Young's modulus is $2\Delta c/c_0=\Delta E/E_0$, where $\Delta c$ is the change in velocity and $\Delta E$ is the change in Young's modulus.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for determining nonlinear hysteretic parameters in a formation through a borehole, comprising:
   generating strain in a volume surrounding the borehole by focusing a low frequency, periodic acoustic signal of a first frequency on the volume, the low frequency, periodic acoustic signal having a first amplitude at a first time and a second amplitude at a second time, wherein the first amplitude of the low frequency, periodic acoustic signal generates first strain in the volume and the second amplitude of the low frequency, periodic acoustic signal generates second strain in the volume;
   transmitting pulsed, high frequency acoustic signals through the volume simultaneously with the generation of strain in the volume with the low frequency, periodic acoustic signal;
   measuring signals generated in the formation in the volume relating to particle velocity or particle acceleration in the formation;

determining the strain in the volume based on the signals generated in the formation in the volume relating to the particle velocity or the particle acceleration in the formation, wherein the strain determined in the volume includes the first strain corresponding to the first amplitude of the low frequency, periodic acoustic signal and the second strain corresponding to the second amplitude of the low frequency, periodic acoustic signal;

measuring time-of-flight of the pulsed, high frequency acoustic signals through the volume as a function of strain within the volume during the generation of strain in the volume with the low frequency, periodic acoustic signal, the time-of-flight of the pulsed, high frequency acoustic signals including a first time-of-flight corresponding to the first strain and a second time-of-flight corresponding to the second strain;

determining change of the time-of-flight of the pulsed, high frequency acoustic signals as the function of the strain in the volume, the change of the time-of-flight of the pulsed, high frequency acoustic signals as the function of the strain in the volume including change from the first time-of-flight corresponding to the first strain to the second time-of-flight corresponding to the second strain; and determining nonlinear hysteretic parameters $\alpha$, $\beta$, and $\delta$ based on the change of the time-of-flight of the pulsed, high frequency acoustic signals as the function of the strain in the volume, wherein the nonlinear hysteretic parameter $\alpha$ relates to strength of hysteresis, the nonlinear hysteretic parameters $\beta$, and $\delta$ are combinations of third- and fourth-order elastic constants representing acoustoelasticity, and pore pressure in the volume is determined based on the nonlinear hysteretic parameters $\alpha$, $\beta$, and $\delta$.

2. The method of claim 1, wherein said borehole comprises an open borehole.

3. The method of claim 1, wherein the low frequency, focused periodic acoustic signal is generated using time reversal.

4. The method of claim 1, wherein the low frequency, focused periodic acoustic signal is generated using phased arrays of acoustic sources.

5. The method of claim 1, wherein the high frequency, pulsed acoustic signals are generated in the borehole.

6. The method of claim 1, wherein the low frequency, focused periodic acoustic signal is generated in the borehole.

7. The method of claim 1, wherein the particle velocity or the particle acceleration is measured using a non-contact vibrometer or a contact accelerometer.

8. The method of claim 1, wherein the low frequency periodic acoustic signal is between 1 Hz and 1000 Hz.

9. The method of claim 1, wherein the high frequency acoustic signal has a frequency between 200 kHz and 1.5 MHz.

10. The method of claim 1, wherein the hysteresis of the nonlinear hysteretic parameters $\alpha$, $\beta$, and $\delta$ as the function of strain in the volume is determined.

11. The method of claim 10, wherein the pore pressure in the volume is determined further based on the hysteresis of the nonlinear hysteretic parameters $\alpha$, $\beta$, and $\delta$ thereof as the function of strain in the volume.

12. The method of claim 11, further comprising the step of calculating fracture failure of said borehole.

13. The method of claim 11, further comprising the step of calculating collapse failure of said borehole.

14. The method of claim 11, further comprising the step of calculating oil recovery performance of said formation.

15. The method of claim 1, wherein determination of the change of the time-of-flight of the pulsed, high frequency acoustic signals includes determination of a ratio of change in perturbed velocity to linear velocity, and the nonlinear hysteretic parameter $\alpha$ is determined based on the ratio of change in perturbed velocity to linear velocity.

16. An apparatus configured to determine nonlinear hysteretic parameters in a formation through a borehole, comprising:

a transceiver trained to focus time-reversed acoustic signals in a focal volume centered on said borehole and generate strain in the focal volume, wherein a first strain at a first amplitude is generated in the focal volume at a first time and a second strain at a second amplitude is generated in the focal volume at a second time;

a probe source comprising a transmitting transducer configured to transmit high frequency acoustic pulses into the focal volume while the transceiver focuses the time-reversed acoustic signals in the focal volume;

a receiver comprising a receiving transducer configured to receive, from the focal volume, the high frequency acoustic pulses transmitted by the probe source;

a signal processor configured to determine time-of-flight of the received high frequency acoustic pulses; and a sensor disposed in the borehole configured to generate signals conveying particle velocity or particle acceleration;

wherein:

the strain in the focal volume is determined based on the signals conveying the particle velocity or the particle acceleration, wherein the strain determined in the focal volume includes the first strain corresponding to the first amplitude at the first time and the second strain corresponding to the second amplitude at the second time;

the time-of-flight of the received high frequency acoustic pulses include a first time-of-flight corresponding to the first strain and a second time-of-flight corresponding to the second strain;

change of the time-of-flight of the received high frequency acoustic pulses as the function of the strain in the focal volume is determined, the change of the time-of-flight of the received high frequency acoustic pulses as the function of the strain in the focal volume including change from the first time-of-flight corresponding to the first strain to the second time-of-flight corresponding to the second strain;

nonlinear hysteretic parameters $\alpha$, $\beta$, and $\delta$ are determined based on the change of the time-of-flight of the received high frequency acoustic pulses as the function of the strain in the focal volume, wherein the nonlinear hysteretic parameter $\alpha$ relates to strength of hysteresis, the nonlinear hysteretic parameters $\beta$, and $\delta$ are combinations of third- and fourth-order elastic constants representing acoustoelasticity; and pore pressure in the focal volume is determined based on the nonlinear hysteretic parameters $\alpha$, $\beta$, and $\delta$.

17. The apparatus of claim 16, wherein the high frequency acoustic pulses have a frequency between 200 kHz and 1.5 MHz.

18. The apparatus of claim 16, wherein said borehole comprises an open borehole.

19. The apparatus of claim 16, wherein said probe source is disposed within the borehole.

20. The apparatus of claim 16, wherein said receiver is disposed within the borehole.

21. The apparatus of claim 16, wherein determination of the change of the time-of-flight of the received high frequency acoustic pulses includes determination of a ratio of change in perturbed velocity to linear velocity, and the nonlinear hysteretic parameter $\alpha$ is determined based on the ratio of change in perturbed velocity to linear velocity.

* * * * *